(12) United States Patent
Beigman Klebanov et al.

(10) Patent No.: US 10,515,314 B2
(45) Date of Patent: Dec. 24, 2019

(54) COMPUTER-IMPLEMENTED SYSTEMS AND METHODS FOR GENERATING A SUPERVISED MODEL FOR LEXICAL COHESION DETECTION

(71) Applicant: Educational Testing Service, Princeton, NJ (US)

(72) Inventors: Beata Beigman Klebanov, Hopewell, NJ (US); Michael Flor, Lawrenceville, NJ (US); Daniel Blanchard, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 1055 days.

(21) Appl. No.: 14/957,769

(22) Filed: Dec. 3, 2015

(65) Prior Publication Data
US 2016/0162806 A1 Jun. 9, 2016

Related U.S. Application Data

(60) Provisional application No. 62/086,791, filed on Dec. 3, 2014.

(51) Int. Cl.
G06N 5/02 (2006.01)
G06N 20/00 (2019.01)
G09B 7/02 (2006.01)
G06F 17/27 (2006.01)

(52) U.S. Cl.
CPC ......... *G06N 20/00* (2019.01); *G06F 17/2715* (2013.01); *G09B 7/02* (2013.01); *G06N 5/02* (2013.01)

(58) Field of Classification Search
None
See application file for complete search history.

(56) References Cited

PUBLICATIONS

Caillet, et al., Unsupervised Learning with Term Clustering for Thematic Segmentation of Texts, Proceeding, RIAO '04 Coupling approaches, coupling media and coupling languages for information retrieval, (2004) pp. 1-10 (Year: 2004).*

Teufel, et al., Sentence Extraction and Rhetorical Classification for Flexible Abstracts, AAAI Technical Report SS-98-06 (1998) pp. 16-25 (Year: 1998).*

(Continued)

*Primary Examiner* — Wilbert L Starks
(74) *Attorney, Agent, or Firm* — Jones Day

(57) ABSTRACT

Systems and methods are provided for a computer-implemented method for identifying pairs of cohesive words within a text. A supervised model is trained to detect cohesive words within a text to be scored. Training the supervised model includes identifying a plurality of pairs of candidate cohesive words in a training essay and an order associated with the pairs of candidate cohesive words based on an order of words in the training essay. The pairs of candidate cohesive words are filtered to form a set of evaluation pairs. The evaluation pairs are provided via a graphical user interface based on the order associated with the pairs of candidate cohesive words. An indication of cohesion or no cohesion is received for the evaluation pairs via the graphical user interface. The supervised model is trained based on the evaluation pairs and the received indications.

20 Claims, 10 Drawing Sheets

(56) References Cited

PUBLICATIONS

Silber, H. Gregory, McCoy, Kathleen; Efficiently Computed Lexical Chains as an Intermediate Representation for Automatic Text Summarization; Computational Linguistics, 28(4); pp. 487-496; 2002.
Somasundaran, Swapna, Burstein, Jill, Chodorow, Martin; Lexical Chaining for Measuring Discourse Coherence Quality in Test-taker Essays; Proceedings of COLING; Dublin, Ireland; pp. 950-961; Aug. 2014.
Stokes, Nicola, Carthy, Joe, Smeaton, Alan; SeLeCT: A Lexical Cohesion Based News Story Segmentation System; Journal of AI Communications, 17(1); pp. 3-12; 2005.
Strube, Michael, Ponzetto, Simone Paolo; WikiRelate! Computing Semantic Relatedness Using Wikipedia; Proceedings of the 21st National Conference on Artificial Intelligence; Boston, MA; pp. 1419-1424; 2006.
Wierzbicka, Anna; English: Meaning and Culture; Oxford University Press: Oxford, UK; 2006.
Xiong, Deyi, Ding, Yang, Zhang, Min, Tan, Chew Lim; Lexical Chain Based Cohesion Models for Document-Level Statistical Machine Translation; Proceedings of the 2013 Conference on Empirical Methods in Natural Language Processing; Seattle, WA; pp. 1563-1573; Oct. 2013.
Yang, Dongqiang, Powers, David; Verb Similarity on the Taxonomy of WordNet; Proceedings of the 3rd International WordNet Conference; Jeju Island, Korea; pp. 121-128; 2006.
Yang, Dongqiang, Powers, David; Word Sense Disambiguation Using Lexical Cohesion in the Context; Proceedings of COLING/ACL 2006, Main Conference, Sydney, Australia; pp. 929-936; 2006.
Zesch, Torsten, Gurevych, Iryna; Automatically Creating Datasets for Measures of Semantic Relatedness; Proceedings of the Workshop on Linguistic Distances; Sydney, Australia; pp. 16-24; Jul. 2006.
Banerjee, Satanjeev, Pedersen, Ted; Extended Gloss Overlaps as a Measure of Semantic Relatedness; Proceedings of the International Joint Conference on Artificial Intelligence; pp. 805-810; 2003.
Barzilay, Regina, Elhadad, Michael; Using Lexical Chains for Text Summarization; Proceeding of the ACL Intelligence Scalable Text Summarization Workshop; 1997.
Beigman Klebanov, Beata, Shamir, Eli; Reader-Based Exploration of Lexical Cohesion; Language Resources & Evaluation, 41; pp. 27-44; 2007.
Ben, Guosheng, Xiong, Deyi, Teng, Zhiyang, Lu, Yajuan, Liu, Qun; Bilingual Lexical Cohesion Trigger Model for Document-Level Machine Translation; Proceedings of the 51st Annual Meeting of the Association for Computational Anguishes; Sofia, Bulgaria; pp. 382-386; Aug. 2013.
Blanchard, Daniel, Heilman, Michael, Madnani, Nitin; SciKit-Learn Laboratory; GitHub repository, https://github.com/EducationalTestingService/skll.; 2013.
Bouma, Gerlof; Normalized (Pointwise) Mutual Information in Collocation Extraction; From Form to Meaning: Processing Texts Automatically; Proceedings of the Biennial GSCL Conference; pp. 31-40; 2009.
Brunn, Meru, Chau, Yllias, Pinchak, Christopher; Text Summarization Using Lexical Chains; Proceedings of the Document Understanding Conference; New Orleans, LA; Sep. 2001.
Budanitsky, Alexander, Hirst, Graeme; Evaluating WordNet-based Measures of Lexical Semantic Relatedness; Computational Linguistics, 32(1); pp. 13-47; 2006.
Bullinaria, John, Levy, Joseph; Extracting Semantic Representations From Word Co-occurrence Statistics: A Computational Study; Behavior Research Methods, 39; pp. 510-526; 2007.
Butt, Miriam; The Light Verb Jungle: Still Hacking Away; In Harvard Working Papers in Linguistics, G. Aygen et al. (Eds.); 2003.
Church, Kenneth, Hanks, Patrick; Word Association Norms, Mutual Information, and Lexicography; Computational Languishes, 16(1); pp. 22-29; 1990.
Cramer, Irene, Finthammer, Marc, Kurek, Alexander, Sowa, Lukas, Wachtling, Melina, Claas, Tobias; Experiments on Lexical Chaining for German Corpora: Annotation, Extraction, and Application; Journal for Language Technology and Computational Linguistics, 23(2); pp. 34-48; 2008.
Deerwester, Scott, Dumais, Susan, Furnas, George, Landauer, Thomas, Harshman, Richard; Indexing by Latent Semantic Analysis; Journal of the American Society for Information Science, 41(6); pp. 391-407; 1990.
Devitt, Ann, Ahmad, Khurshid; Sentiment Polarity Identification in Financial News: A Cohesion-Based Approach; Proceedings of the 45th Annual Meeting of the Association of Computational Linguistics; Prague, Czech Republic; pp. 984-991; Jun. 2007.
Ercan, Gonenc, Cicekli, Ilyas; Using Lexical Chains for Keyword Extraction; Information Processing & Management, 43(6); pp. 1705-1714; 2007.
Finkelstein, Lev, Gabrilovich, Evgeniy, Matias, Yossi, Revlin, Ehud, Solan, Zach, Wolfman, Gadi, Ruppin, Eytan; Placing Search in Context: The Concept Revisited; ACM Transactions on Information Systems, 20(1); pp. 116-131; Jan. 2002.
Flor, Michael, Beigman Klebanov, Beata; Associative Lexical Cohesion as a Factor in Text Complexity; International Journal of Applied Linguistics,165(2); pp. 223-258; 2014.
Gabrilovich, Evgeniy, Markovitch, Shaul; Computing Semantic Relatedness Using Wikipedia-Based Explicit Semantic Analysis; Proceedings of the 20th International Joint Conference on Artificial Intelligence; pp. 1606-1611; 2007.
Graff, David, Cieri, Christopher; English Gigaword LDC2003T05; Linguistic Data Consortium; Philadelphia, PA; 2003.
Guinaudeau, Camille, Gravier, Guillaume, Sebillot, Pascale; Enhancing Lexical Cohesion Measure with confidence Measures, Semantic Relations and Language Model Interpolation for Multimedia Spoken Content Topic Segmentation; Computer Speech and Language, 26(2); pp. 90-104; 2012.
Gurevych, Iryna, Strube, Michael; Semantic Similarity Applied to Spoken Dialogue Summarization; In Proceedings of COLING 2004, Geneva, Switzerland; pp. 764-770; 2004.
Halliday, Michael, Hasan, Rugaiya; Cohesion in English; Longman: London; 1976.
Hoang, Flung Huu, Kim, Su Nam, Kan, Min-Yen; A Re-Examination of Lexical Association Measures; Proceedings of the Workshop on Multi-word Expressions: Identification, Interpretation, Disambiguation and Applications; Singapore; pp. 31-39; Aug. 2009.
Hollingsworth, Bill, Teufel, Simone; Human Annotation of Lexical Chains: Coverage and Agreement Measures; Proceedings of the Workshop on Methodologies and Evaluation of Lexical Cohesion Techniques in Real-world Applications; Savador, Brazil; Aug. 2005.
Inkpen, Diana, Desilets, Alain; Semantic Similarity for Detecting Recognition Errors in Automatic Speech Transcripts; Proceedings of the Human Language Technology Conference and Conference on Empirical Methods in Natural Language Processing; Vancouver, British Columbia, Canada; pp. 49-56; Oct. 2005.
Jarmasz, Mario, Szpakowicz, Stan; Roget's Thesaurus and Semantic Similarity; Proceedings of the Conference on Recent Advances in Natural Language Processing; Borovets, Bulgaria; pp. 212-219; Sep. 2003.
Jespersen, Otto; A Modem English Grammar on Historical Principles, Part VI Morphology; George Allen & Unwin Ltd.: London, UK; 1961.
Jiang, Jay, Conrath, David; Semantic Similarity Based on Corpus Statistics and Lexical Taxonomy; Proceedings of the International Conference Research on Computational Linguistics; Taiwan; 1997.
Kiss, G., Armstrong, Christine, Milroy, R., Piper, J.; An Associative Thesaurus of English and Its Computer Analysis; In the Computer and Literary Studies, A. Aitken et al. (Eds.); University Press: Edinburgh, UK; pp. 153-165; 1973.
Knott, Alistair; A Data-Driven Methodology for Motivating a Set of Coherence Relations; Ph.D. Thesis, University of Edinburgh, UK; 1996.
Lin, Dekang; Automatic Retrieval and Clustering of Similar Words; Proceedings of the 17th International Conference on Computational Linguistics, 2; pp. 768-774; 1998.

(56) References Cited

PUBLICATIONS

Madnani, Nitin, Dorr, Bonnie; Generating Phrasal and Sentential Paraphrases: A Survey of Data-Driven Methods; Computational Linguistics, 36(3); pp. 341-387; 2010.
Madnani, Nitin, Heilman, Michael, Tetreault, Joel; Identifying High-Level Organizational Elements in Argumentative Discourse; 2012 Conference of the North American Chapter of the Association for Computational Linguistics: Human Language Technologies; Montreal, Canada; pp. 20-28; Jun. 2012.
Marathe, Meghana, Hirst, Graeme; Lexical Chains Using Distributional Measures of Concept Distance; Computational Linguistics and Intelligent Text Processing, 6008; pp. 291-302; 2010.
Marcu, Daniel; The Rhetorical Parsing, Summarization, and Generation of Natural Language Texts; Ph.D. Thesis, University of Toronto; 1997.
McNemar, Quinn; Psychological Statistics; John Wiley & Sons: New York, NY; 1955.
Miller, George, Charles, Walter; Contextual Correlates of Semantic Similarity; Language and Cognitive Processes, 6(1); pp. 1-28; 1991.
Miller, George; WordNet: A Lexical Database for English; Communications of the ACM, 38(11); pp. 39-41; 1995.
Mohammad, Saif, Hirst, Graeme; Distributional Measures of Concept-Distance: A Task-oriented Evaluation; Proceedings of the 2006 Conference on Empirical Methods in Natural Language Processing; pp. 35-43; Jul. 2006.
Moldovan, Dan, Novischi, Adrian; Lexical Chains for Question Answering; Proceedings of the 19th International Conference on Computational Linguistics, 1; pp. 1-7; 2002.
Morris, Jane, Hirst, Graeme; The Subjectivity of Lexical Cohesion in Text; Ch. 5 in J. Shanahan, Y. Qu & J. Wiebe (Eds.), Computing Attitude and Affect in Text; Springer Dordrecht, The Netherlands; pp. 41-48; 2005.
Nelson, Douglas, McEvoy, Cathy, Schreiber, Thomas; The University of South Florida Free Association, Rhyme, and Word Fragment Norms; Behavior Research Methods, Instruments, & Computers, 36(3); pp. 402-407; 2004.
Pantel, Patrick; Inducing Ontological Co-occurrence Vectors; Proceedings of the 43rd Annual Meeting of the 4Association for Computational Linguistics; Ann Arbor, MI; pp. 125-132; Jun. 2005.
Patwardhan, Siddharth, Pedersen, Ted; Using WordNet-based Context Vectors to Estimate the Semantic Relatedness of Concepts; In EACL Workshop Making Sense of Sense: Bringing Computational Linguistics and Psycholinguistics Together; pp. 1-8; 2006.
Qian, Tao, Ji, Donghong, Zhang, Mingyao, Teng, Chong, Xia, Congling; Word Sense Induction Using Lexical Chain Based Hypergraph Model; Proceedings of Coling, the 25th International Conference on Computational Linguistics: Technical Papers; Dublin, Ireland; pp. 1601-1611| Aug. 2014.
Reeve, Lawrence, Han, Hyoil, Brooks, Ari; BioChain: Lexical Chaining Methods for Biomedical Text Summarization; The 21st Annual ACM Symposium on Applied Computing; pp. 180-184; Apr. 2006.
Remus, Steffen, Biemann, Chris; Three Knowledge-Free Methods for Automatic Lexical Chain Extraction; Proceedings of the NAACL-HLT; Atlanta, GA; pp. 989-999; Jun. 2013.
Resnik, Philip; Using Information Content to Evaluate Semantic Similarity in a Taxonomy; Proceedings of International Joint Conference on Artificial Intelligence; pp. 448-453; 1995.
Riedl, Martin, Biemann, Chris; How Text Segmentation Algorithms Gain from Topic Models; Proceedings of NAACL, Montreal, Canada; pp. 553-557; Jun. 2012.
Rubenstein, Herbert, Goodenough, John; Contextual Correlates of Synonymy; Communications of the ACM, 8(10); pp. 627-633; Oct. 1965.

\* cited by examiner

| Feature Set | E1 | E2 |
|---|---|---|
| Free Association only | 0.410 | 0.388 |
| PMI only | 0.378 | 0.381 |
| Dist. Similarity only | 0.307 | 0.275 |
| WordNet only | 0.288 | 0.264 |
| Distance only | 0.231 | 0.231 |
| Repetition only | 0.062 | 0.054 |
| All Features | 0.554 | 0.524 |
| All Features except: | | |
| – Repetition | 0.550 | 0.525 |
| – Distance | 0.540 | |
| – Dist. Similarity | 0.530 | 0.519 |
| – WordNet | 0.520 | 0.508 |
| – PMI | 0.518 | 0.499 |
| – Free Association | 0.487 | 0.468 |
| – Dist. Similarity & PMI | 0.499 | 0.474 |
| – WordNet & Free Association | 0.464 | 0.434 |
| – Distance & Repetition | 0.542 | 0.500 |

FIG. 6

COMPUTER-IMPLEMENTED SYSTEMS AND METHODS FOR GENERATING A SUPERVISED MODEL FOR LEXICAL COHESION DETECTION

CROSS-REFERENCE TO RELATED APPLICATIONS

This application claims priority to U.S. Provisional Patent Application No. 62/086,791, filed Dec. 3, 2014, entitled "Supervised Learning of Lexical Cohesion in Text and Application to Estimation of Text Complexity," the entirety of which is incorporated herein by reference in its entirety.

FIELD

The technology described in this patent document relates generally to text response scoring and more particularly to automatically scoring cohesion of a text using a computer-implemented scoring model.

BACKGROUND

The field of automated essay evaluation seeks to build systems that evaluate the overall quality of essays consistent with how a human would score those essays. An accurate, reliable automated evaluation engine can provide a large time and cost savings over manual human scoring alternatives. In developing automated scoring systems, developers seek to generate features that accurately approximate human impressions of essay quality. One such human impression is the cohesion of a text being evaluated. A reader's ability to construct meaning and flow from text is greatly influenced by the presence and organization of cohesive elements in the text. Systems and methods as described herein provide a solution to the problem of measuring text cohesion by providing mechanisms for extracting cohesion-indicating metrics from a text under consideration.

SUMMARY

Systems and methods are provided for a computer-implemented method for identifying pairs of cohesive words within a text. A supervised model is trained to detect cohesive words within a text to be scored. Training the supervised model includes identifying a plurality of pairs of candidate cohesive words in a training essay and an order associated with the pairs of candidate cohesive words based on an order of words in the training essay. The pairs of candidate cohesive words are filtered to form a set of evaluation pairs. The evaluation pairs are provided via a graphical user interface based on the order associated with the pairs of candidate cohesive words. An indication of cohesion or no cohesion is received for the evaluation pairs via the graphical user interface. The supervised model is trained based on the evaluation pairs and the received indications. An essay to be scored is provided to the trained supervised model, where the trained supervised model identifies pairs of cohesive words within the essay to be scored.

As another example, a system for identifying pairs of cohesive words within a text includes a processing system comprising one or more data processors and a non-transitory computer-readable medium encoded with instructions for commanding the one or more data processors to execute steps of a method. In the method, a supervised model is trained to detect cohesive words within a text to be scored. Training the supervised model includes identifying a plurality of pairs of candidate cohesive words in a training essay and an order associated with the pairs of candidate cohesive words based on an order of words in the training essay. The pairs of candidate cohesive words are filtered to form a set of evaluation pairs. The evaluation pairs are provided via a graphical user interface based on the order associated with the pairs of candidate cohesive words. An indication of cohesion or no cohesion is received for the evaluation pairs via the graphical user interface. The supervised model is trained based on the evaluation pairs and the received indications. An essay to be scored is provided to the trained supervised model, where the trained supervised model identifies pairs of cohesive words within the essay to be scored.

As a further example, a computer-readable medium is encoded with instructions for commanding a processing system comprising one or more data processors to execute steps of a method for identifying pairs of cohesive words within a text. In the method, a supervised model is trained to detect cohesive words within a text to be scored. Training the supervised model includes identifying a plurality of pairs of candidate cohesive words in a training essay and an order associated with the pairs of candidate cohesive words based on an order of words in the training essay. The pairs of candidate cohesive words are filtered to form a set of evaluation pairs. The evaluation pairs are provided via a graphical user interface based on the order associated with the pairs of candidate cohesive words. An indication of cohesion or no cohesion is received for the evaluation pairs via the graphical user interface. The supervised model is trained based on the evaluation pairs and the received indications. An essay to be scored is provided to the trained supervised model, where the trained supervised model identifies pairs of cohesive words within the essay to be scored.

BRIEF DESCRIPTION OF THE DRAWINGS

FIG. 6 is a table indicating performance of an example generated model.

DETAILED DESCRIPTION

Figure 1:
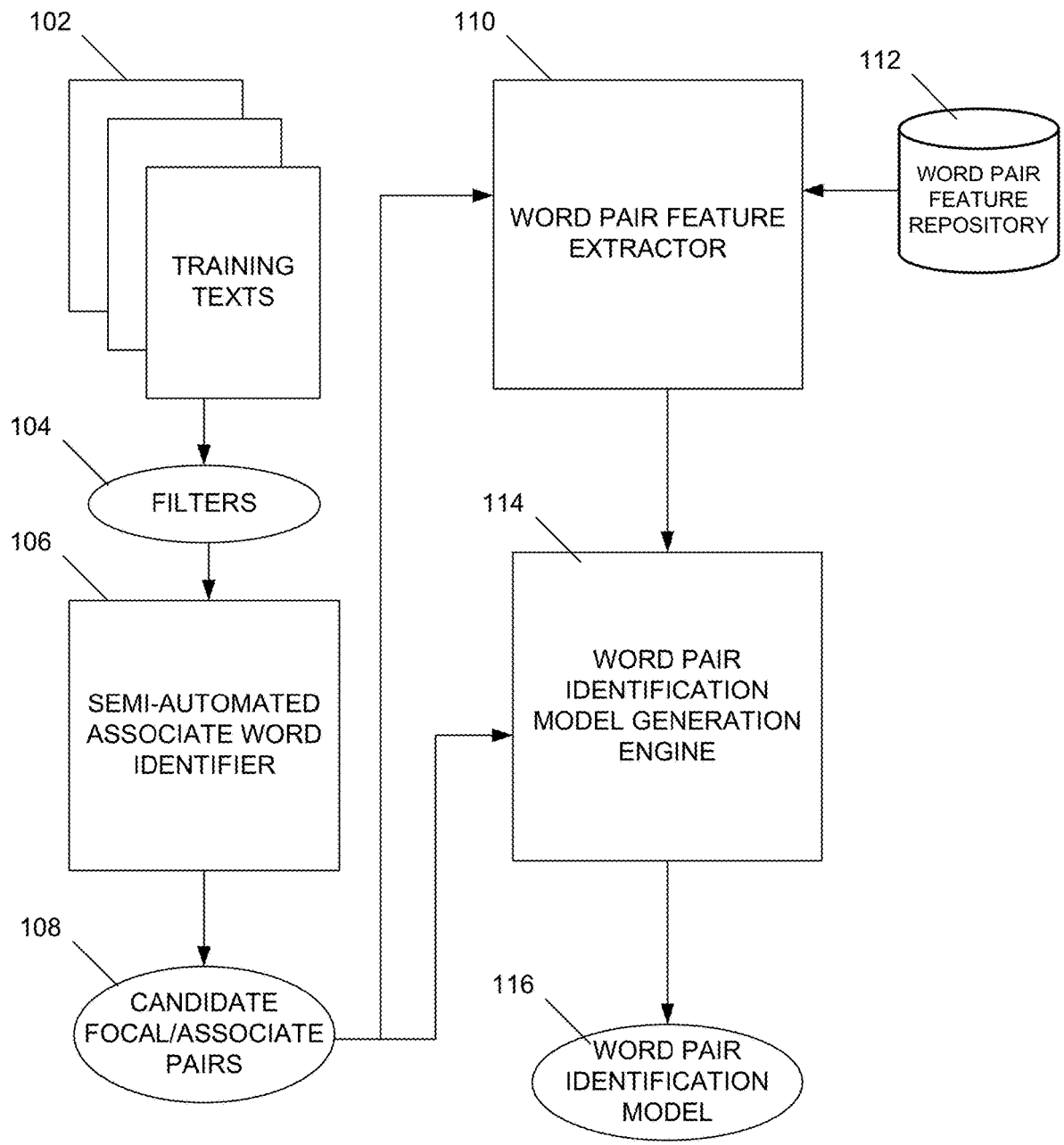
FIG. 1 is a block diagram depicting a computer implemented system for generating a word pair identification model.

FIG. 1 is a block diagram depicting a computer implemented system for generating a word pair identification model. Like many semantic and pragmatic phenomena, lexical cohesion in a text is elusive from the point of scientific inquiry. Lexical cohesion is intuitively plausible and clear examples of the phenomenon are easy to find. On the other hand, it is difficult to capture in a valid and reliable fashion in a human-created gold standard because non-trivial texts are so rich in lexical meanings, connections, and associations. Because of the amorphous bounds of whether a pair of words are cohesively related, where those bounds do not submit to hard and fast rules, a significant difficulty arises in attempting to train a computer-system to mimic a human's ability to identify cohesively related pairs of words.

Automated, computer scoring of texts (e.g., scoring of quality of texts produced in an examination or scholastic environment, determining a difficulty level of texts to be provided to readers) provides huge benefits to organizations involved in the wide scale evaluation of received texts. Such texts have historically been evaluated by human raters with good results. But the cost of human raters' efforts as well as the time costs of human utilization makes using human evaluators impractical for many applications (e.g., non-high-stakes testing). Programming a computer to mimic the evaluation capabilities of a human rater is extremely challenging, especially where the criteria for certain evaluation metrics are less than rigid and rely on human judgment of the raters. Generation of a computer-based scoring model that mimics human rating judgment is a challenge particular to the computer realm, requiring significant algorithmic intelligence and computer capabilities that are well beyond taking some human practice known to the world and merely stating "perform it on the computer."

Systems and methods as described herein provide a number of benefits over prior art systems including creation of a model for identifying cohesive pairs of words in a text that is significantly more accurate than prior efforts. The supervised learning system described herein replicates human judgments of within-text pairwise lexical cohesion with a high degree of success. The model described herein utilizes multiple different measures for capturing semantic relatedness that contribute as features in the supervised model in a complementary way. Further, multiple uses of such a model are described including a text complexity application that demonstrates that a machine-learned model of pairwise cohesion improves performance of prior existing text complexity measures.

In order to generate a model that mimics a human's ability to identify pairs of cohesive words, certain embodiments of systems and methods described herein utilize examples of cohesive word pairs that are actually identified by human raters. Characteristics of cohesive word pairs identified by human raters are identified and incorporated into a computerized scoring model that then mimics the human's ability to identify cohesive word pairs.

Training of such a model requires a large number of example cohesive word pairs, and human identification of cohesive word pairs can be a highly laborious task. Even a modest length text includes very large numbers of possible word pairs. For example, a single 400 word essay includes nearly 80,000 possible pairs of words. It is not feasible for a human rater to exhaustively evaluate such a large number of word pairs. Thus, systems and methods for training a supervised model for identifying cohesive word pairs, in one embodiment, provides a semi-automatic user interface for identifying cohesive word pairs in a training text in an intelligently limited manner. Such systems and methods filter the potentially very large number of candidate word pairs, based on one or more filter criteria, to a more workable, limited number of candidate pairs that retains most of the pairs that a rater is most likely to identify as a cohesive word pair.

With reference to FIG. 1, a system receives a plurality of training texts 102 to be presented to a human rater for evaluation. Such texts can take a wide variety of forms, such as 50+ essays presented by test takers having a range of words from 150-1000 words, averaging around 400-500 words. A system utilizes one or more filters 104 to limit the number of candidate word pairs that are to be presented to a human evaluator. As mentioned above, an exhaustive evaluation of all possible word pairs in a text is highly impractical for a human rater to perform in a reasonable amount of time for even a moderate length text. The filters 104 seek to eliminate a substantial number of word pairs that a human rater is unlikely to identify as a cohesive word pair, leaving a targeted list of candidate cohesive word pairs for the human rater to give a Yes or No indication of whether the words form a cohesive word pair.

At 106, the candidate cohesive word pairs are presented to the human rater for evaluation. In one embodiment, candidate cohesive word pairs are presented as focal word-associate word pairs. From the candidate word pairs, a focal word is identified and associate words that precede the focal word in the text are sequentially identified for consideration by the human rater. In one implementation, the human raters are asked to, for every word pair identified in the text, ask themselves whether the identified associate word helps the easy accommodation of the focal word into the evolving story. If the associate word does help the easy accommodation of the focal word, then the human rater should indicate that the candidate word pair is indicative of a cohesive word pair. Cohesive word pairs are output at 108 from the semi-automated associated word identifier module 106.

Having identified cohesive word pairs at 108, as indicated by the human rater, the system begins training a supervised model that enables a computer to automatically identify cohesive word pairs in future-provided texts. A word pair feature extractor 110 compiles metrics regarding each cohesive word pair 108 identified by the human rater. Such metrics may be compiled using one or more external repositories 112 that store lexical data, such as WordNet repositories and PMI repositories, as discussed further herein.

Once cohesive word pairs and their corresponding metric values are compiled, a word pair identification model generation engine 114 utilizes those metric values to generate a supervised word pair identification model 116 that mimics the human rater's ability to identify cohesive word pairs. Metrics associated with the cohesive word pairs 108 identified by the human raters are used by the trained model 116 as a proxy for the human raters' innate ability to judge cohesiveness. At 114, statistical methods are performed to generate the word pair identification model 116 that is used by a computer to automatically identify cohesive word pairs in texts that are provided to the model 116.

Figure 2:
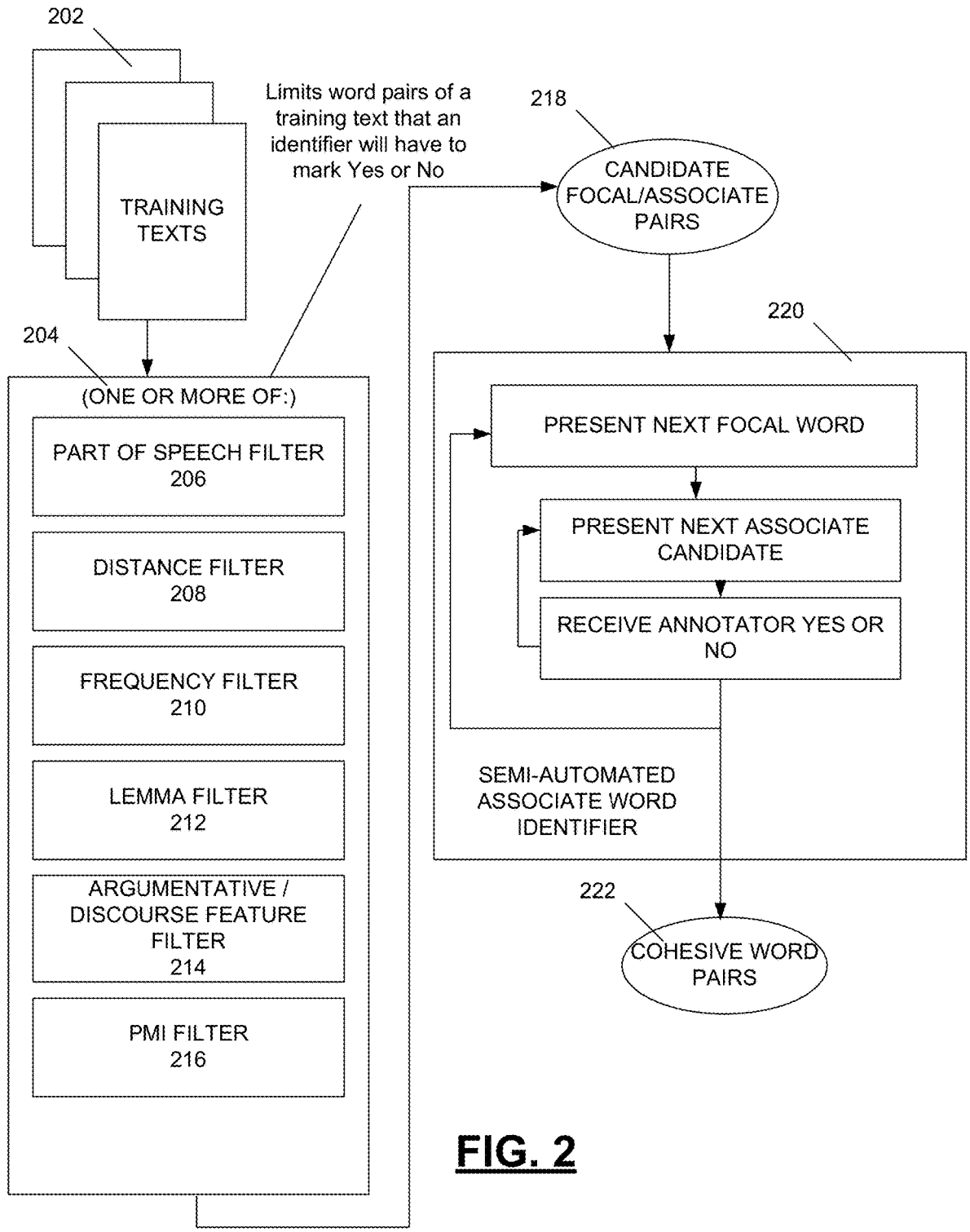
FIG. 2 is a diagram depicting example details of certain filters and the semi-automated associate word identifier depicted in FIG. 1.

FIG. 2 is a diagram depicting example details of certain filters and the semi-automated associate word identifier depicted in FIG. 1. At 202, one or more training texts are received by a set of one or more filters 204. The filters 204 are configured to reduce a set of candidate word pairs presented in the training texts 202 to a reasonable number that can be considered by a human rater. The filters 204 are designed to identify candidate word pairs that are not unlikely to be identified by a human rater as being a cohesive word pair. Correspondingly, the filters 204 seek to eliminate word pairs that have a low probability of being identified by a human rater as a cohesive word pair.

One or more of a variety of word pair filters may be applied to the exhaustive pool of word pairs present in a training text. For example, a part of speech filter 206 can be applied to limit candidate word pairs 214 to word pairs that contain at least one or only words of particular parts of speech, such as nouns, verbs, adjectives, and adverbs. Such a filter can remove pairs of words that include words that are seldom identified in cohesive word pairs, such as prepositions and articles. In one example, a distance filter 208 is utilized. In that example, the system filters out all focal-associate pairs that are more than a threshold (e.g., 1000 words) distance apart in the text. Careful selection of a threshold can allow capturing long-distance lexical connections while excluding candidate pairs that are likely too far apart to exhibit cohesion. A frequency filter can be applied at 210. Certain very frequent words often carry very small amounts of lexical cohesion. Thus, in one example, a frequency filter 210 removes words with a frequency above 0.001 in a large (billion) word corpus of texts (e.g. Gigaword 2003 plus selected science and fiction texts). A lemma filter 212 is applied in some embodiments that limits candidate pairs to the first candidate pair that includes a word in a lemma-based family (e.g., the first appearance of love, loved, loving, lovable in a text). Such a filter can limit repetitive evaluation of highly similar candidate word pairs. In another embodiment, an argumentative/discourse feature filter 214 is applied. Because training texts 202 often include argumentative essays written for a test, certain constructs (e.g., argument signposting words and discourse constructs (examples, reasons, assumptions)) commonly appear in the training texts 202 that rarely result in cohesive word pair identifications. A shell detector (e.g., a Madnani shell detector) can be applied as a filter to remove such general words that typically include a low degree of lexical content. Other filtering and adjustment of the texts to be human evaluated can be performed including performing automated spelling adjustments before application of filters to improve performance of filters.

Figure 3:
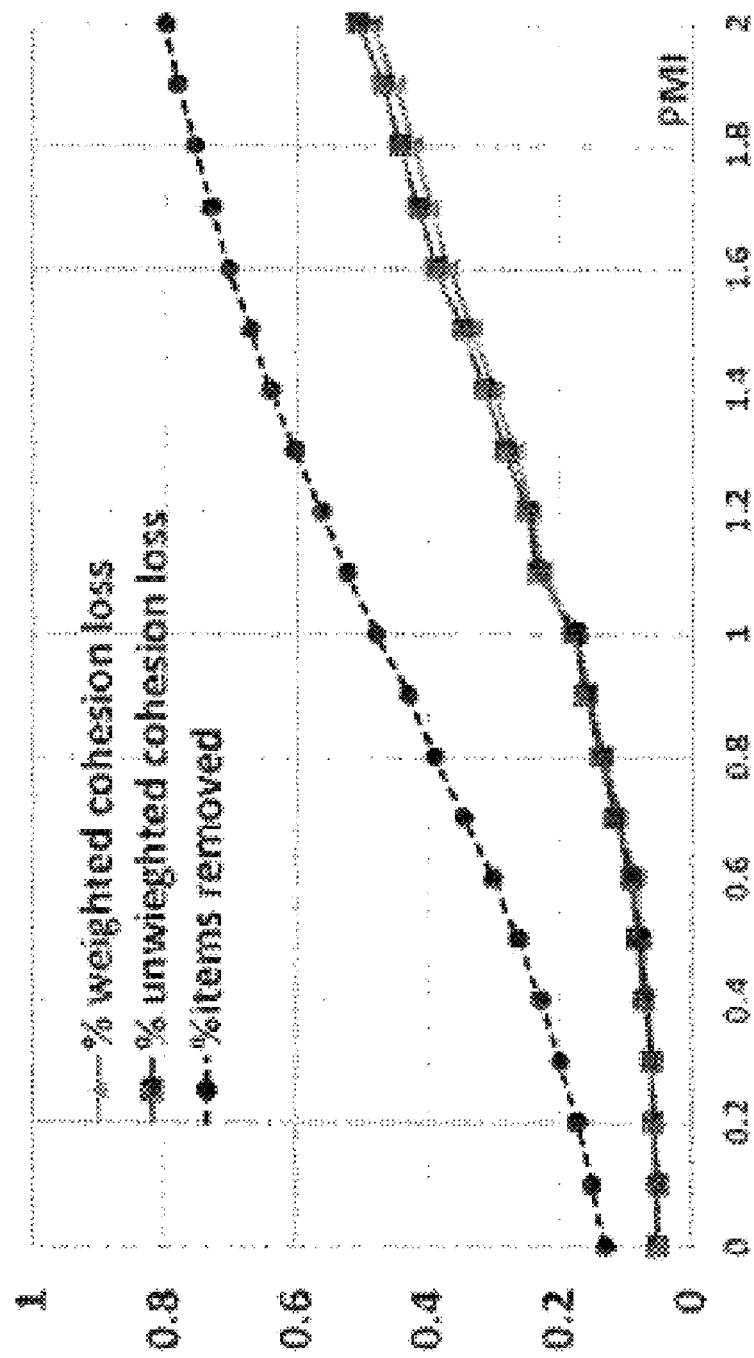
FIG. 3 depicts results of an example experiment that analyzes what percentage of cohesive word pairs identified by a human rater are lost when candidate pairs having PMI values below a threshold are filtered from consideration.

As a final example, a pointwise mutual information (PMI) filter can be applied at 216. Such a filter is applied based on an assumption that pairs of words that exhibit a low degree of co-occurrence in a large corpus are unlikely to be semantically or associatively related. Each possible pair of words in the training texts 202 can be looked up in a PMI data store to identify how often those words appear in texts of the large corpus. Word pairs having PMI values below a selected threshold are excluded by the PMI filter 216. To set the threshold, in one embodiment, an experiment is performed that analyzes what percentage of cohesive word pairs identified by a human rater are lost when candidate pairs having PMI values below a threshold are removed from consideration. FIG. 3 depicts results of such an example experiment. As indicated in FIG. 3, by selecting a PMI threshold of 0.7, 33% of all candidate word pairs are removed from consideration. In exchange for this significant reduction in pairs to be presented to a human rater, only 12% of identified cohesive word pairs would be lost. In one embodiment, 0.7 was thus selected as an acceptable PMI threshold for filtering at 216.

With reference back to FIG. 2, at the conclusion of the filtering by the one or more filters 204, a limited set of candidate focal/associate word pairs 218 are output for express consideration by a human rater using a semi-automated associate word identifier 220. In the example of FIG. 2, the candidate word pairs 218 are presented to the human rater via a pair of nested for loops, where each focal word is identified for the human rater in combination with each candidate associate word for that focal word identified in the pairs 218. The human rater indicates yes or no for each candidate associate word for a focal word before the semi-automated associate word identifier 220 moves to the next focal word. Once the human rater has given a thumbs up or down for each of the candidate word pairs 218, a set of human-identified cohesive word pairs 222 is output from the identifier module 220.

Figure 4:
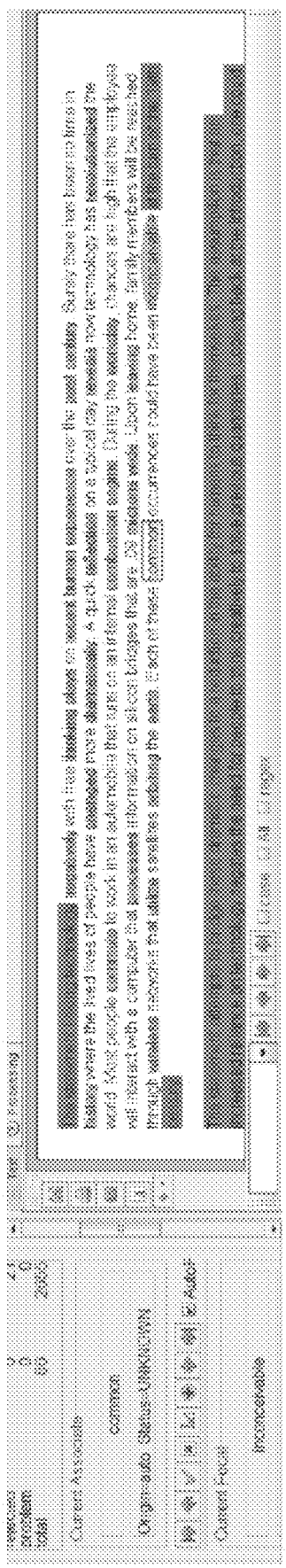
FIG. 4 is a diagram depicting a user interface of an example semi-automated associate word identifier.

FIG. 4 is a diagram depicting a user interface of an example semi-automated associate word identifier. A graphical user interface displays a portion of a text for evaluation by a human rater. The human rater is provided a series of candidate word pairs to consider. The human rater is tasked, for each candidate pair, to identify whether a highlighted candidate associate word is an anchor for an indicated focal word, thus meaning that the focal word-associate word pair forms a cohesive word pair. In the example of FIG. 4, the word "inconceivable" is indicated as a current focal word. The candidate associate word "common" is currently highlighted as being under consideration. The associate word identifier is waiting for a response from the human evaluator on whether inconceivable and common should be noted as a cohesive word pair. The user interface indicates a number of previous candidate associate words that the human evaluator has already considered. Words indicated in grey (e.g., negatively, plays, century) have been determined by the human evaluator not to form a cohesive word pair with the focal word inconceivable. Words indicated in green (e.g., thinking, changed, revolutionized) have been indicated as forming cohesive word pairs with inconceivable. Indications of such are stored.

Once the user provides input on whether "common" forms a cohesive word pair with "inconceivable," a next candidate word for inconceivable is highlighted for consideration by the human scorer. When all of the candidate associate words for "inconceivable" have been considered, a next focal word is highlighted, and the human rater is guided through all candidate associate words for that next focal word.

The user interface includes a number of guides for facilitating ease of cohesive word pair identification by the human evaluator, including the highlights of words discussed above. The user interface also includes buttons for indicating Yes or No for a particular candidate word pair. The user interface further includes a changed background for words that do not appear in any candidate word pairs for the focal word under consideration. For example, words outside of the distance threshold (e.g., "The statement linking technology") have a green background because those words precede the focal word by too large a distance. Further, words after the focal word are also indicated by an augmented background because, in the present embodiment, only candidate associate words that precede the focal word are to be considered by the human rater. Other words having a white background (e.g., with, free, on) do not appear in candidate word pairs with inconceivable, oftentimes because candidate pairs associated with those white background words were filtered, such as using one of the filters described herein above.

Figure 5:
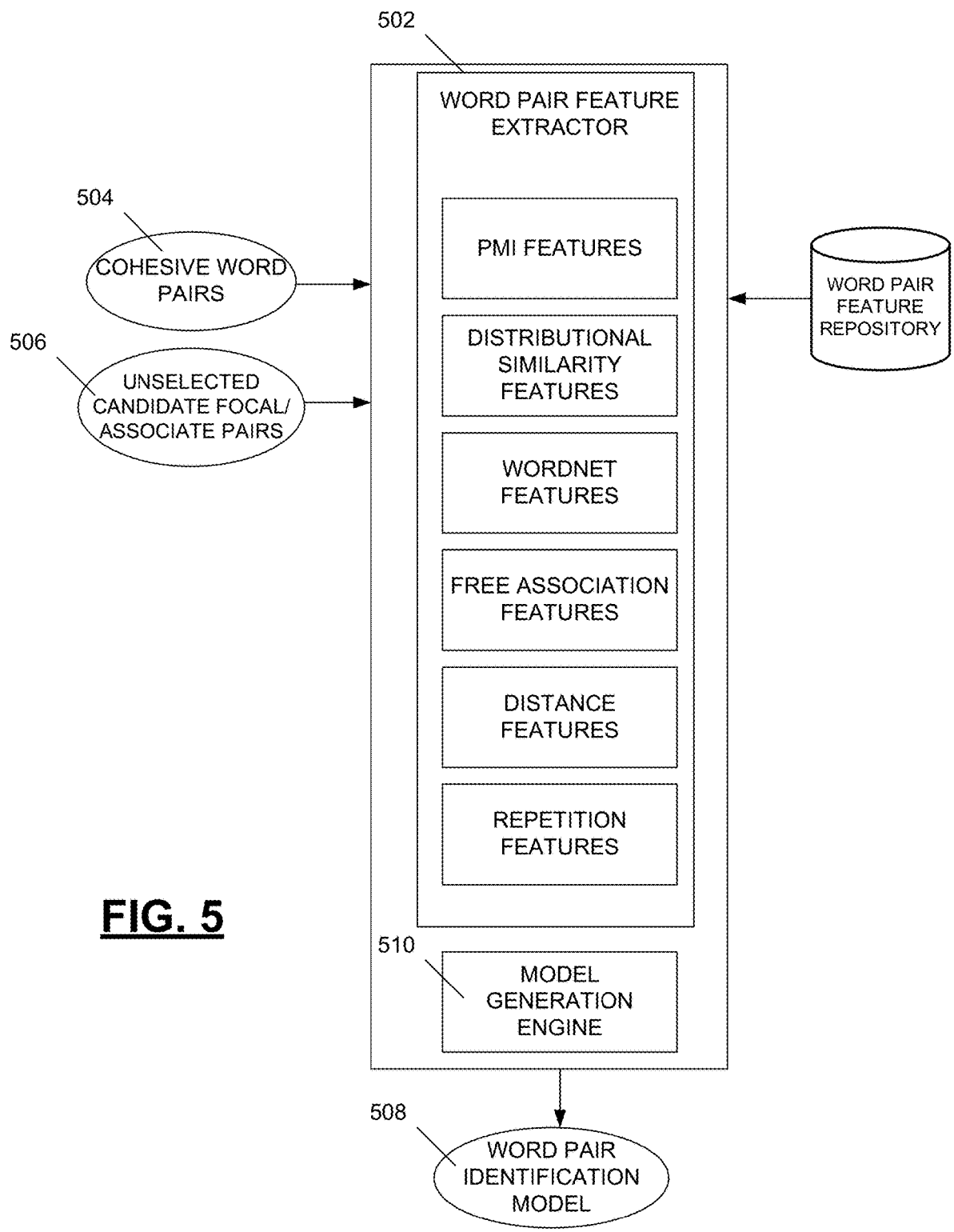
FIG. 5 is a diagram depicting a word pair feature extractor configured to identify features of cohesive word pairs and to use those features to generate a word pair identification model.

Once cohesive word pairs have been identified in the training texts by human evaluators, characteristics of those word pairs can be determined/calculated to identify characteristics of what makes a pair of words in a text likely a cohesive word pair. FIG. 5 is a diagram depicting a word pair feature extractor configured to identify features of cohesive word pairs, such as by extracting those features from an external data store, and to use those features to generate a word pair identification model. The feature extractor 502 cycles through each cohesive word pair 504 indicated by the human evaluator and determines metrics associated with those word pairs 504. In one embodiment, candidate word pairs that are not selected as cohesive word pairs 506 are also considered as negative examples for training a word pair identification model 508 output by a model generation engine 510.

The features extracted by the word pair feature extractor 502 can take a variety of forms. In one embodiment, PMI family features are extracted, such as a PMI metric, a weighted PMI metric, an NFMax-PMI metric, a normalized PMI metric, and a positive normalized PMI metric. Such metrics tend to quantify the association of two words as the extent to which the probability of their co-occurrence in the same text exceeds chance. In an embodiment, one or more distributional similarity features are extracted, such as a cosine in Latent Semantic Analysis space, a probability of generating one word as a paraphrase of the other, and a distributional similarity according to Lin's thesaurus. In a further example, one or more WordNet metrics are extracted, such as semantic relatedness combining information from the hierarchy and glosses of WordNet and a binary feature that indicates that two words are members of the same WordNet sysnset. In another example, one of more Free Associations Family features are extracted, a quantification of strength of association of the words of a pair <w1, w2> as the proportion of respondents to the cue of the first word of the pair who provided the second word of the pair as a response. Examples of such a feature include a largest of two strengths of a double-direct association between the pair of words (if both w1-w2 and w2-w1 were observed); the largest strength of a direct association between either w1-w2 or w2-w1 where one of those values can be zero; the selectiveness of shared associations (for all words w3 so that w1 and w2 are in direct association with w3, the system takes the inverse of the corpus frequency per million words of the rarest w3, if no such w3 exists, the metric value is set to 0); and a binary feature indicating the existence of a shared associate in the text (there exists a w3 in the text so that w1 and w2 are in direct association with w3). In a further example, a distance metric is determined that utilizes the distance in words between the focal word and the closest preceding instance of the associate word of a cohesive word pair. As another example, a repetition metric counts up to two metrics counting appearances of the words in a candidate word pair in the text. It is noted that in one example, none of the extracted features are lexicalized—that is, all features are based on the relationship between words in a pair but not the identity of the words themselves.

Having extracted metrics for the cohesive word pairs 504 and/or the unselected pairs 506, a model generation engine 510 can utilize one or more regressors to generate the word pair identification model 508. Example regressors include gradient boosting, ridge, support vector, and random forest regressors, as well as rescaled versions of the random forest regressors. In one experiment, a Rescaled Random Forest Regressor was found to give best results. FIG. 6 is a table indicating performance of that generated model that utilizes all of the above described features, for baselines that utilize only one of the feature families, as well as for ablation experiments where some of the feature families were removed from the full model. Results in the table of FIG. 6 are shown in quadratic weighted kappa, averaged across folds.

Figure 7:
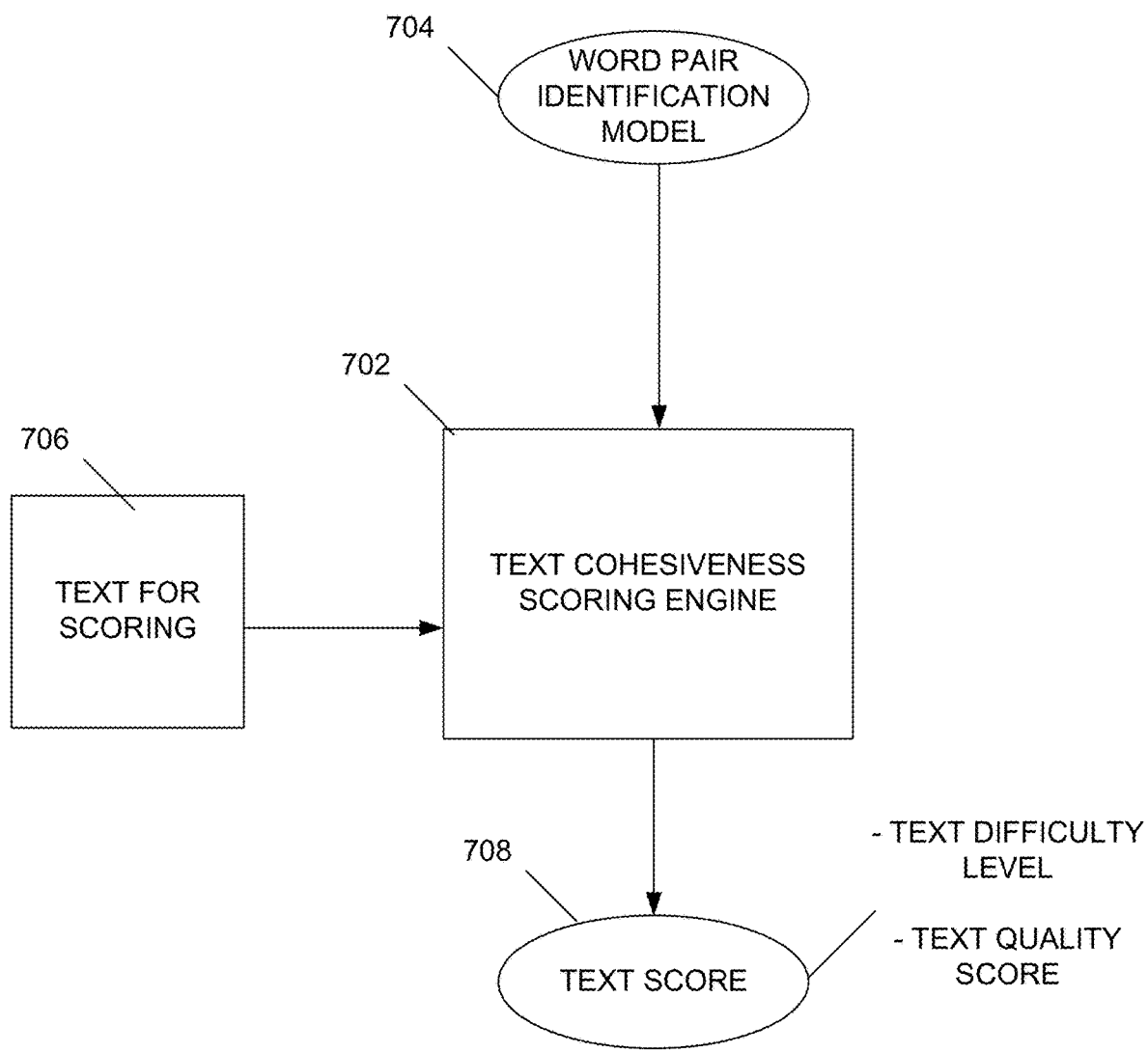
FIG. 7 is a diagram depicting a text cohesiveness scoring engine that utilizes cohesive word pairs indicated by a word pair identification model.

Once the word pair identification model has been generated, it can be used to identify word pairs in texts that are then provided to the model. FIG. 7 is a diagram depicting a text cohesiveness scoring engine that utilizes cohesive word pairs indicated by a word pair identification model. A text cohesiveness scoring engine 702 receives a word pair identification model 704 and a text to be scored 706. The model 702 is configured to ascertain metric values for candidate word pairs in the text for scoring 706, such as the PMI, distributional similarity, WordNet, Free Associations Family, distance, and repetition features described above. Based on a comparison of a weighted average/sum of those metric values to a threshold, as dictated by the word pair identification model 704, a determination is made as to whether a candidate word pair in the text for scoring 706 should be deemed a cohesive word pair (i.e., would a human annotator indicate such a candidate word pair as a cohesive word pair). Based on that determination, the text cohesiveness metric tabulates a word pair measure (e.g., a mean cohesion measure) of the text that is being scored 706. That text cohesiveness metric can be used alone, or in combination with other features, to provide a text score 708 for the text being scored 706. For example, a text cohesiveness metric can be used as an indicator of essay quality, where essays having high degrees of cohesiveness, and thus high text cohesiveness metric values, are often viewed as being higher quality essays. In another example, a text cohesiveness metric can be used in determining a difficulty level of an input text (e.g., a grade level), where texts having low cohesiveness metric values tend to be more difficult texts.

Figure 8:
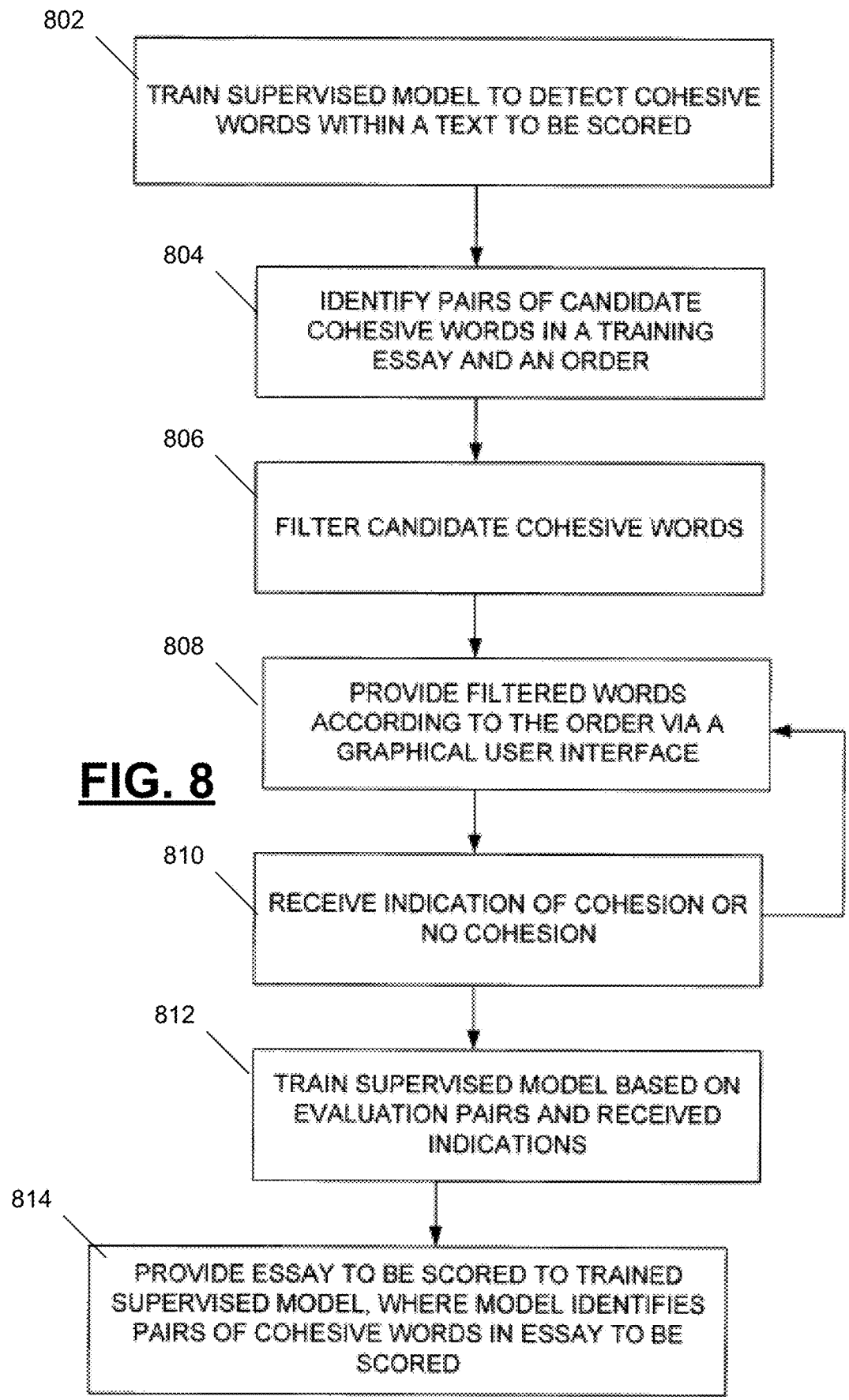
FIG. 8 is a flow diagram depicting a computer-implemented method for identifying pairs of cohesive words within a text.

FIG. 8 is a flow diagram depicting a computer-implemented method for identifying pairs of cohesive words within a text. At 802, a supervised model is trained to detect cohesive words within a text to be scored. Training the supervised model includes identifying a plurality of pairs of candidate cohesive words in a training essay and an order associated with the pairs of candidate cohesive words based on an order of words in the training essay at 804. At 806, the pairs of candidate cohesive words are filtered to form a set of evaluation pairs. The evaluation pairs are provided at 808 via a graphical user interface based on the order associated with the pairs of candidate cohesive words. An indication of cohesion or no cohesion is received for the evaluation pairs via the graphical user interface at 810. At 812, the supervised model is trained based on the evaluation pairs and the received indications. An essay to be scored is provided to the trained supervised model at 814, where the trained supervised model identifies pairs of cohesive words within the essay to be scored.

Figure 9A:
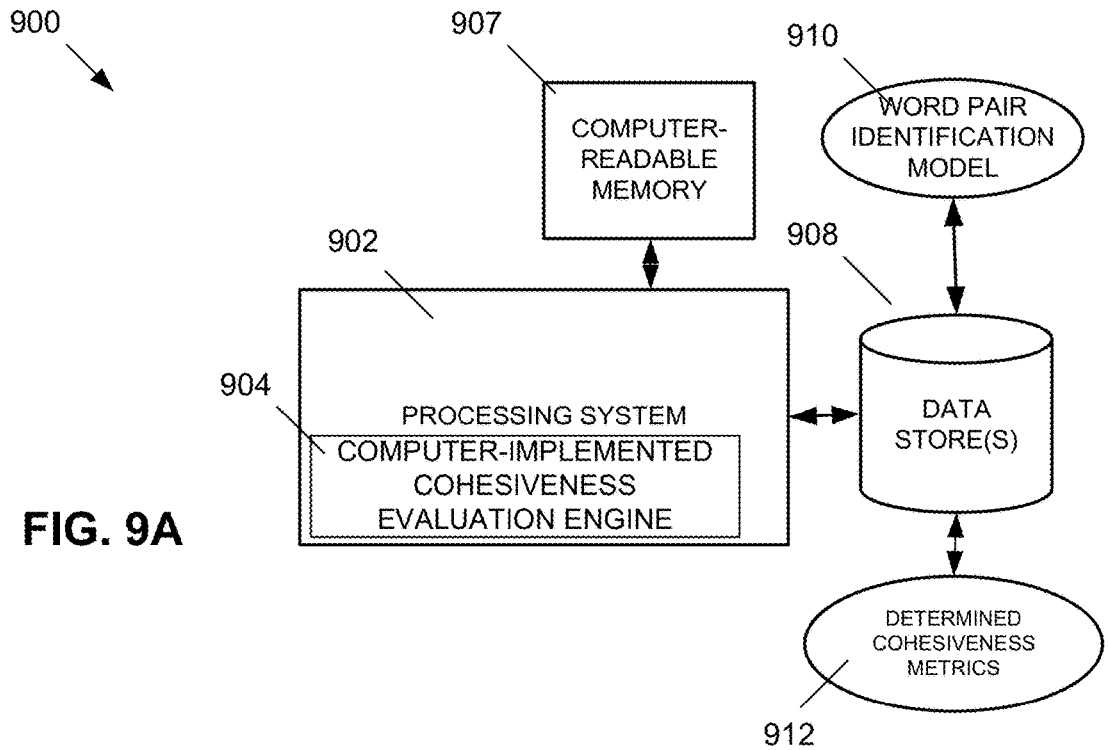
FIGS. 9A, 9B, and 9C depict example systems for implementing the approaches described herein for implementing a computer-implemented cohesiveness evaluation engine.
Figure 9B:
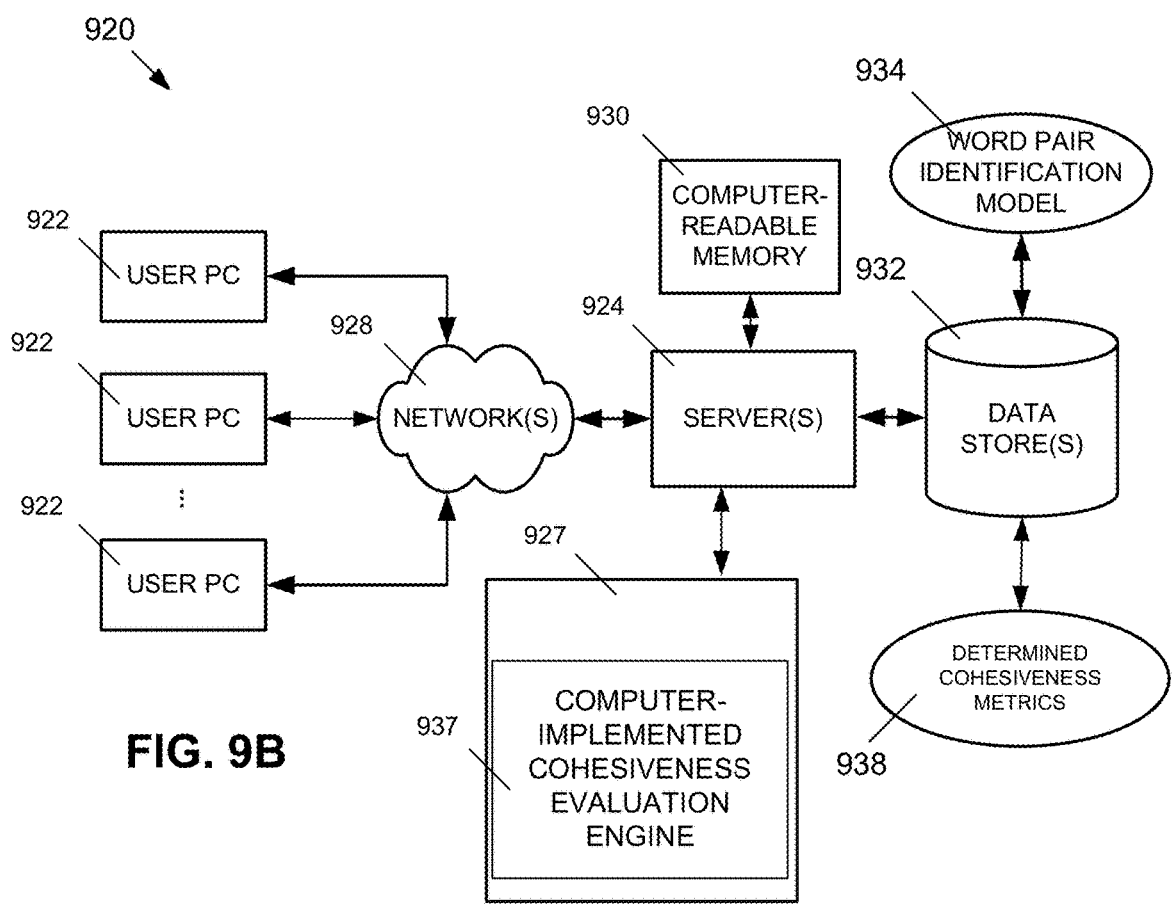
Figure 9C:
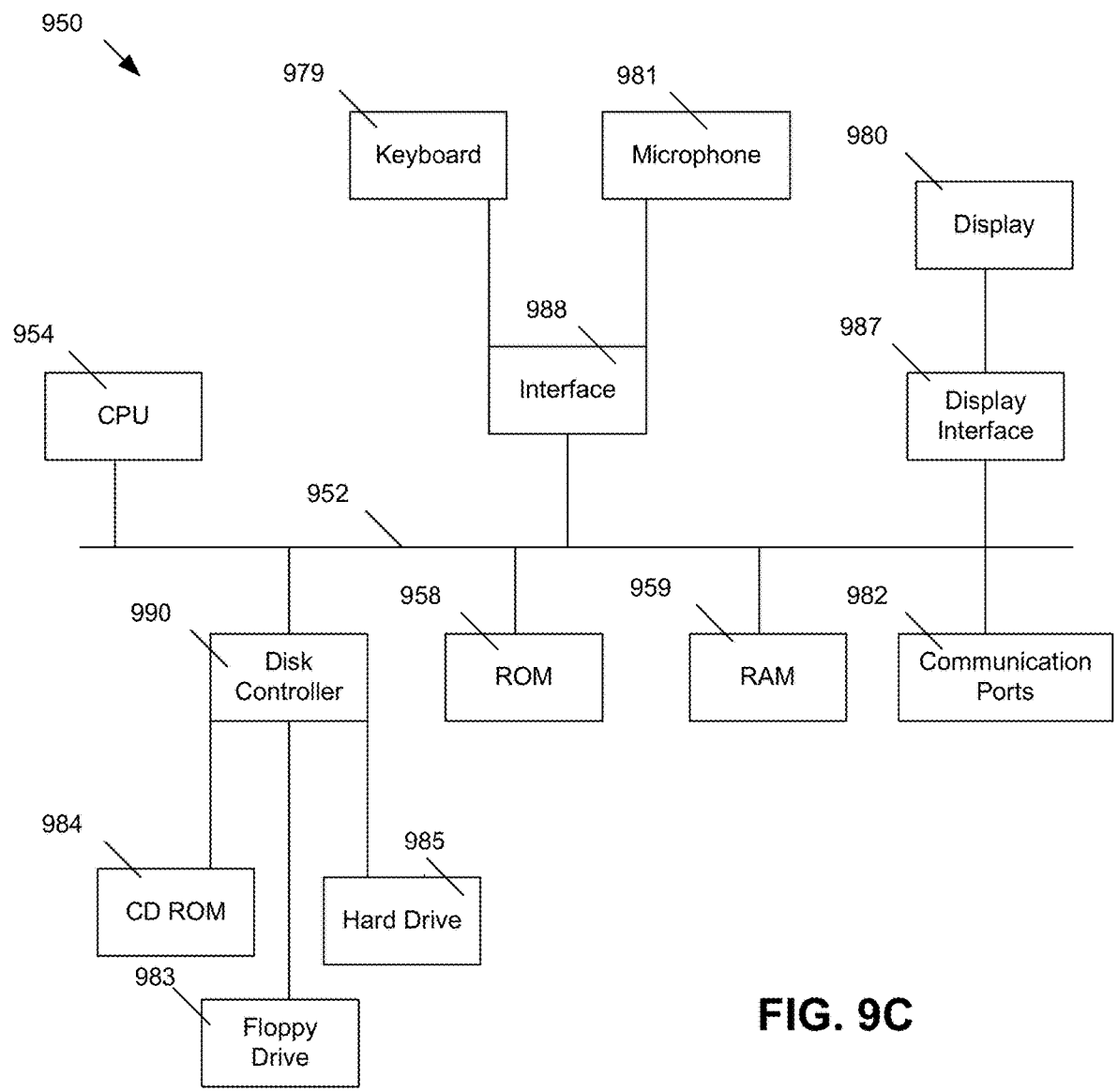

FIGS. 9A, 9B, and 9C depict example systems for implementing the approaches described herein for implementing a computer-implemented cohesiveness evaluation engine. For example, FIG. 9A depicts an exemplary system 900 that includes a standalone computer architecture where a processing system 902 (e.g., one or more computer processors located in a given computer or in multiple computers that may be separate and distinct from one another) includes a computer-implemented cohesiveness evaluation engine 904 being executed on the processing system 902. The processing system 902 has access to a computer-readable memory 907 in addition to one or more data stores 908. The one or more data stores 908 may include a word pair identification model 910 as well as determined cohesiveness metrics 912. The processing system 902 may be a distributed parallel computing environment, which may be used to handle very large-scale data sets.

FIG. 9B depicts a system 920 that includes a client-server architecture. One or more user PCs 922 access one or more servers 924 running a computer-implemented cohesiveness evaluation engine 937 on a processing system 927 via one or more networks 928. The one or more servers 924 may access a computer-readable memory 930 as well as one or more data stores 932. The one or more data stores 932 may include a word pair identification model 934 as well as determined cohesiveness metrics 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing the method of implementing a computer-implemented cohesiveness evaluation engine. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 908, 930, 958, 959 or data stores 908, 932, 983, 984, 988 may include one or more data structures for storing and associating various data used in the example systems for implementing a computer-implemented cohesiveness evaluation engine. For example, a data structure stored in any of the aforementioned locations may be used to store data from XML files, initial parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for identifying pairs of cohesive words within a text, comprising:
   training a supervised model to detect cohesive words within a text to be scored, wherein training the supervised model comprises:
      identifying a plurality of pairs of candidate cohesive words in a training essay and an order associated with the pairs of candidate cohesive words based on an order of words in the training essay;
      filtering the pairs of candidate cohesive words to form a set of evaluation pairs;
      providing the evaluation pairs via a graphical user interface based on the order associated with the pairs of candidate cohesive words;
      receiving an indication of cohesion or no cohesion for the evaluation pairs via the graphical user interface;
      training the supervised model based on the evaluation pairs and the received indications;
   providing an essay to be scored to the trained supervised model, wherein the trained supervised model identifies pairs of cohesive words within the essay to be scored.

2. The method of claim 1, wherein providing the evaluation pairs comprises:
   displaying a portion of the training essay;
   indicating a focal word from the evaluation pairs in the training essay;
   highlighting one of a plurality of candidate associate words of the evaluation pairs that appears in the training essay before the focal word, wherein fewer than all words appearing in the training essay are candidate associate words based on the filtering;

receiving and storing an indication of sufficient relatedness between the focal word and the highlighted candidate associate word from an annotator;

highlighting additional candidate associate words and receiving and storing indications for those additional candidate associate words until all candidate associate words of the focal word have been considered by the annotator;

indicating a next focal word in the training essay.

3. The method of claim 1, wherein filtering the pairs of candidate cohesive words evaluation pairs from all possible pairs of words in the training essay using filters based on one or more of:

part of speech or words in a word pair;
distance between words in a word pair;
frequency of appearance of words in a word pair;
multiple appearances of words in a word pair;
words that typically appear in a predetermined type of essay associated with the training essay.

4. The method of claim 1, further comprising providing a score for the essay to be scored based on a number of pairs of cohesive words identified in the essay to be scored.

5. The method of claim 4, wherein the essay to be scored is provided a score that indicates a quality of the essay or a difficulty of the essay based on the number of pairs of cohesive words identified.

6. The method of claim 1, wherein training the supervised model comprises identifying one or more features associated with a particular evaluation pair that has received an indication of cohesion via the graphical user interface, wherein the one or more features include one or more of:

a pointwise mutual information feature;
a distributional similarity feature;
a semantic relatedness feature determined based on a hierarchical word corpus;
a free association feature;
a distance feature; and
a repetition feature.

7. The method of claim 6, wherein certain features of the particular evaluation pair are accessed from a word pair feature repository.

8. The method of claim 1, wherein the supervised model is trained utilizing a regressions process that utilizes one or more regressors of:

gradient boosting, ridge, support vector, and random forest.

9. The method of claim 1, wherein identifying pairs of cohesive words within the essay to be scored comprises:

identifying candidate pairs in the essay to be scored;
determining features of each candidate pair in the essay to be scored;
determining a score for each candidate pair based on the determined features;
incrementing a word pair measure for the essay to be scored when the score for a candidate pair exceeds a threshold.

10. The method of claim 9, wherein the word pair measure is a mean cohesion measure of the essay to be scored.

11. A computer-implemented system for identifying pairs of cohesive words within a text, comprising:

a processing system comprising one or more data processors and a non-transitory computer-readable medium encoded with instructions for commanding the one or more data processors to execute steps comprising:

training a supervised model to detect cohesive words within a text to be scored, wherein training the supervised model comprises:

identifying a plurality of pairs of candidate cohesive words in a training essay and an order associated with the pairs of candidate cohesive words based on an order of words in the training essay;

filtering the pairs of candidate cohesive words to form a set of evaluation pairs;

providing the evaluation pairs via a graphical user interface based on the order associated with the pairs of candidate cohesive words;

receiving an indication of cohesion or no cohesion for the evaluation pairs via the graphical user interface;

training the supervised model based on the evaluation pairs and the received indications;

providing an essay to be scored to the trained supervised model, wherein the trained supervised model identifies pairs of cohesive words within the essay to be scored.

12. The system of claim 11, wherein providing the evaluation pairs comprises:

displaying a portion of the training essay;
indicating a focal word from the evaluation pairs in the training essay;
highlighting one of a plurality of candidate associate words of the evaluation pairs that appears in the training essay before the focal word, wherein fewer than all words appearing in the training essay are candidate associate words based on the filtering;

receiving and storing an indication of sufficient relatedness between the focal word and the highlighted candidate associate word from an annotator;

highlighting additional candidate associate words and receiving and storing indications for those additional candidate associate words until all candidate associate words of the focal word have been considered by the annotator;

indicating a next focal word in the training essay.

13. The system of claim 11, wherein filtering the pairs of candidate cohesive words evaluation pairs from all possible pairs of words in the training essay using filters based on one or more of:

part of speech or words in a word pair;
distance between words in a word pair;
frequency of appearance of words in a word pair;
multiple appearances of words in a word pair;
words that typically appear in a predetermined type of essay associated with the training essay.

14. The system of claim 11, wherein the steps further comprise providing a score for the essay to be scored based on a number of pairs of cohesive words identified in the essay to be scored.

15. The system of claim 14, wherein the essay to be scored is provided a score that indicates a quality of the essay or a difficulty of the essay based on the number of pairs of cohesive words identified.

16. The system of claim 11, wherein training the supervised model comprises identifying one or more features associated with a particular evaluation pair that has received an indication of cohesion via the graphical user interface, wherein the one or more features include one or more of:

a pointwise mutual information feature;
a distributional similarity feature;
a semantic relatedness feature determined based on a hierarchical word corpus;

a free association feature;
a distance feature; and
a repetition feature.

17. The system of claim 16, wherein certain features of the particular evaluation pair are accessed from a word pair feature repository.

18. The system of claim 11, wherein the supervised model is trained utilizing a regressions process that utilizes one or more regressors of:
gradient boosting, ridge, support vector, and random forest.

19. The system of claim 11, wherein identifying pairs of cohesive words within the essay to be scored comprises:
identifying candidate pairs in the essay to be scored;
determining features of each candidate pair in the essay to be scored;
determining a score for each candidate pair based on the determined features;
incrementing a word pair measure for the essay to be scored when the score for a candidate pair exceeds a threshold.

20. A non-transitory computer-readable medium encoded with instructions for commanding a processing system comprising one or more data processors to execute steps of a method for identifying pairs of cohesive words within a text, the method comprising:
training a supervised model to detect cohesive words within a text to be scored, wherein training the supervised model comprises:
identifying a plurality of pairs of candidate cohesive words in a training essay and an order associated with the pairs of candidate cohesive words based on an order of words in the training essay;
filtering the pairs of candidate cohesive words to form a set of evaluation pairs;
providing the evaluation pairs via a graphical user interface based on the order associated with the pairs of candidate cohesive words;
receiving an indication of cohesion or no cohesion for the evaluation pairs via the graphical user interface;
training the supervised model based on the evaluation pairs and the received indications;
providing an essay to be scored to the trained supervised model, wherein the trained supervised model identifies pairs of cohesive words within the essay to be scored.

* * * * *